United States Patent Office 3,258,327
Patented June 28, 1966

3,258,327
MIXTURE FOR PELLETIZING IRON ORE
Thomas W. Smoot, Bethel Park, Pa., assignor to Harbison-Walker Refractories Company, Pittsburgh, Pa., a corporation of Pennsylvania
No Drawing. Filed Oct. 31, 1963, Ser. No. 320,510
8 Claims. (Cl. 75—3)

The present invention relates to a novel mixture for pelletizing iron ore concentrates and accelerating sintering thereof.

The use of finely divided iron ores and finely divided iron ore concentrates in the form of hardened pellets as blast furnace charging material is increasing constantly. The amount of iron ore consumed in this form will continue to grow as recourse is had more and more to such sources of iron as taconite which, prior to benefication to increase the percentage content of iron oxide, must be ground very fine.

Heretofore, in the preparation of pellets for such use, fine ore or concentrate was mixed with a binder and moisture (water, for example,) and this mixture was fed to a rotating drum or the like, to recover substantially spherical pellets of relatively low structural strength. This low strength in the pellets required that they be subjected to a drying treatment at an elevated temperature in a furnace to obtain a densified product of sufficient structural strength to withstand handling and shipping, as well as abrasion in the blast furnace, without undue breakage. Further, the binders previously used have been found to possess various undesirable characteristics.

A binder now commonly employed in mixes for the production of iron ore pellets, is bentonite; it is a plastic clay having pronounced bloating and moisture absorbent properties. Bentonite promotes the agglomeration of ore into compact spheres and greatly increases the dry strength of the spheres upon drying. Dry strength is obviously desirable to avoid a breakdown of the pellets when subjected to rough handling. However, bentonite alone has been found to have various undesirable characteristics as will be described hereinafter.

In typical blast furnace operation one of the variables requiring careful control is the chemical balance of the slag composition. When the slag is balanced, it contains a required impurity level and viscosity, so that the furnace may be easily tapped after a heat is complete and the slag readily separated from the molten metal. Whether the slag can be balanced in a particular heat is largely determined by the $CaO+MgO$ to $SiO_2$ ratio in the charge in the furnace. It is understood that the ratio is desirably between 1 and 1.5 to 1.

A proper slag balance is relatively difficult to obtain when bentonite (alone or in combination with some minor strengthening ingredient) is used for pelletizing the common iron ores being used today such as, Mesabi and Venezuelan ores, owing to the relatively high proportion of CaO and MgO in the bentonite, and thus in the charge to the furnace.

It is therefore an object of the present invention to provide a novel and improved mixture for pelletizing iron ore and iron ore concentrates.

Another object of the invention is to provide a mixture for accelerating sintering and densification of the pelletized ores.

Other objects of the invention will be apparent hereinafter.

Broadly, in accordance with an embodiment of the present invention, there is provided a binder mixture for pelletizing iron ore concentrates and for subsequently accelerating the sintering of the pellets. The mixture consists of, by weight, about 1 to 5% bentonite, the balance being a clay which is comprised of kaolinite, illite, and chlorite. The illite and chlorite should be at least partially degraded (broken down).

In a preferred embodiment, the bentonite employed contains from about 2 to 3% of $Na_2O$ (by weight on an oxide basis) and is Wyoming bentonite. In general, an iron ore pellet in accordance with this invention is an almost spherical body composed of particles of iron ore chemically bonded together by a particular bentonite-clay mixture.

Preparation of the pellets includes introducing finely ground iron ore into a rotating drum or the like. Immediately thereafter the bentonite and clay mixture containing kaolinite, illite, and chlorite is fed to the drum in an amount from 0.25 to 5% by weight based on the weight of iron ore. Finally, a suitable amount of water is added to the ore-bentonite-clay mixture. The amount of water employed is regulated to produce a pellet having sufficient green strength to keep it from breaking up or falling apart prior to complete curing. A green strength of from 3 to 4 p.s.i. is considered adequate. It has been found that about 1 to 6%, by weight, of water, based on the weight of the total dry solids, is adequate to provide the necessary green strength.

The pelletizing drum is rotated on its longitudinal axis so the solids are initially contacted with each other in such a way as to form small, almost perfect spheroids. The amount of solids and the length of the rolling period is regulated to produce pellets of desired radii, although it should be understood that the size of pellets of a given batch of ore charged to the drum may vary within reasonable limits. Such limits will be determined by the economies of the pelletizing operation, the use to which the pellets are to be put, etc. However, it has been found that to obtain pellets of a diameter of from ½" to 1" (a preferred embodiment) a rolling time of only from 15 to 30 seconds is necessary. When the pellets reach the desired size, they are removed from the drum. The discharge of the pellets, when the desired size is attained may be automatic and is accomplished by the proper biasing or sloping (tilting) of the pelletizing drum in a manner well known to those skilled in the art. In effect, at a given slope, only those pellets of a given weight will roll down the drum to discharge.

The discharged pellets are collected and subsequently charged to a sintering furnace or kiln, where they are heated to a sintering temperature for a length of time sufficient to produce a desired charge size for blast furnace operations. Each of the pieces of charge is an agglomerate of a plurality of the spheroids.

It also was found that the clay-bentonite mixture of the invention is a superior flux which accelerates the formation of the charge agglomerates. A sintered charge agglomerate of the order of 4" maximum cross section dimension is considered desirable.

As stated previously, the pelletizing mix of the invention consists of from 1 to 5% by weight of bentonite which bentonite consists predominantly of the mineral montmorillonite which contains from 2 to 3% of $Na_2O$, based on the weight of the bentonite, and from 95 to 99% of a clay containing kaolinite, illite, and chlorite. The desirability of such a mixture can be further emphasized with reference to the following table:

Table I

CATION EXCHANGE CAPACITY OF CLAY MINERALS
(MILLIEQUIVALENTS PER 100 GRAMS

| | |
|---|---|
| Kaolinite | 3–15 |
| Montmorillonite | 80–10 |
| Illite | 10–40 |
| Chlorite | 10–40 |

The cation exchange capacity is indicative of a mineral's ability to ionize, and with respect to the present invention, to pelletize the iron ore concentrate. Particularly good results are obtained when a pelletizing mixture has a cation exchange capacity of from about 30 to 70 milliequivalents per 100 grams. The cation exchange capacity of the mixture of the invention falls within this range. Also the pelletizing mixture of the invention has a relatively low $CaO+MgO$ content (i.e. less than 2%).

Referring to Table II there is indicated a series of clays containing the desired proportions of kaolinite, illite, and chlorite along with the content of $SiO_2$ and $CaO+MgO$. An exemplary analysis of Wyoming bentonite is also shown. These clays may be described generally as mid-continent expandable refractory clays from the Pennsylvanian age or system. A particularly suitable clay is one found in Pennsylvania which is called Kileen clay.

A charge for the blast furnace is comprised of the following: 0.25 to 5%, by weight, based on the weight of the iron ore, plus its flux (a calcium carbonate, for example), and fuel (usualy powdered coal), of any of the following clays numbered 1 through 7, plus a minor amount of the Wyoming bentonite. (As noted elsewhere, the Wyoming bentonite comprises 5%, by weight, of the clay and bentonite mixture; or 0.0125 to 0.25% of the total blast furnace charge is Wyoming bentonite.)

*Table II*

| Clay | $SiO_2$ (Percent) | $CaO+MgO$ (Percent) |
| --- | --- | --- |
| 1. Kileen | 63.1 | 1.1 |
| 2. Ohiopyle Hard | 54 | 0.2 |
| 3. Ohiopyle Soft | 51.2 | 1.0 |
| 4. Blair | 77.7 | 0.2 |
| 5. Bigler Plastic | 59.3 | 0.9 |
| 6. Cordova Plastic | 62.4 | 1.2 |
| 7. Thermal Strip | 62.7 | 1.3 |
| Wyoming Bentonite | 64 | 3.5 |

When an iron ore charge is prepared, it is desired that the $CaO+MgO$ to $SiO_2$ of the total charge ratio falls between 1 and 1.5 to 1. The $CaO+MgO$ to $SiO_2$ ratio of the pelletizing mix should be less than about .02 to 1 so as not to affect the slag balance in the blast furnace.

The following examples are illustrative of the teachings of the invention.

EXAMPLE I

A batch of Kileen clay containing about 40% kaolinite, 30% illite, and 30% chlorite was reduced to −65 mesh +1 micron and blended with 5% bentonite. The batch mixture was introduced into a rolling drum containing Mesabi iron ore concentrate. The mixture constituted 1.5% by weight of the total batch. A total of 2% water was added to the mixture. The iron ore became pelletized after 30 seconds of rotation of the drum pelletizer. The pellets were removed and appeared to be substantially spheriodal and to have an average diameter of about ½″. The pellets were tested and found to have a green cold crushing strength of about 4 p.s.i.

EXAMPLE II

The above procedure was repeated using 2% bentonite. The pelletizing time was slightly longer but the results obtained were similar in other respects to Example I.

EXAMPLE III

Each of the clays listed in Table II was reduced to −65 mesh +1 micron and were blended with 5% bentonite. The mixture was introduced in the amount of 1.5% by weight of the iron ore and 3% water was added on the basis of the combined batch. The pelletizing time was about 20 seconds and substantially all of the pellets recovered were acceptable.

EXAMPLE IV

Two iron ore batches were mixed and blended with 1.5% by weight of a mixture of 95 parts Kileen clay plus 5 parts Wyoming bentonite in the proportions shown in Table III.

*Table III*

| Components | Percent of Total | $SiO_2$ | $Al_2O_3$ | CaO | MgO | Fe |
| --- | --- | --- | --- | --- | --- | --- |
| High Specular Hematite Concentrate | 44.9 | 2.9 | 0.27 | 0.01 | 0.020 | 41.7 |
| Venezuelan Ore | 42.9 | .76 | .76 | .14 | .120 | 41.1 |
| $CaCO_2$ (Flux) | 8.9 | 0.27 | 0.06 | 6.51 | 1.740 | 0.3 |
| $SiO_2$ | 2.0 | 2.00 | | | | |
| Kileen Clay (95%) +Bentonite (5%) | 1.3 | 0.84 | 0.31 | .005 | .004 | .03 |
| Totals | 100.0 | 6.77 | 1.40 | 6.665 | 1.884 | 83.13 |

This Table III composition is considered a preferred embodiment of the invention. The $CaO+MgO$ to $SiO_2$ ratio was calculated from the totals and was found to be 1.27 to 1 which is within the range previously described.

While the invention has been described with reference to particular embodiments and examples, it will be understood, of course, that modifications, substitutions and the like may be made therein without departing from its scope except as limited by the claims.

I claim:

1. A mixture for pelletizing iron ore concentrates and accelerating sintering thereof consisting essentially of by weight from about 1 to 5% bentonite and the balance a clay comprising at least kaolinite, illite, and chlorite, the latter two minerals being at least partially degraded.

2. A mixture for pelletizing iron ore concentrates and accelerating sintering thereof consisting essentially of by weight from about 1 to 5% bentonite and the balance a clay comprising at least 10% of kaolinite, from 10 to 30% of degraded illite and from 10 to 30% of degraded chlorite.

3. The mixture of claim 2 in which the cation exchange capacity is from 30 to 70 milliequivalents per 100 grams.

4. The mixture of claim 2 in which the bentonite contains from 2 to 3% of $Na_2O$.

5. A pelletizing and sintering mix consisting essentially of by weight from 0.25 to 5 parts of a mixture of by weight from 1 to 5% bentonite and from 95 to 99% of a clay comprising kaolinite, illite and chlorite and the balance substantially all being selected from the group consisting of iron ore and iron ore concentrates.

6. A pelletizing and sintering mix consisting essentially of by weight from 1 to 3 parts of a mixture of by weight from 1 to 5% bentonite and from 95 to 99% of a clay comprising at least 10% of kaolinite, from 10 to 30% of degraded illite and from 10 to 30% of degraded chlorite and the balance substantially all from the group consisting of iron ore and iron ore concentrates.

7. The mix of claim 6 containing in addition from 1 to 6% by weight of water.

8. A mixture for pelletizing iron ore concentrates and accelerating sintering thereof consisting essentially of by weight from about 1 to 5% bentonite and the balance a mid-continent expandable refractory clay from the Pennsylvanian system.

No references cited.

BENJAMIN HENKIN, *Primary Examiner.*